United States Patent

[11] 3,577,851

| [72] | Inventors | John Stanley Detheridge<br>Birmingham;<br>John William March, Hanworth, England |
|---|---|---|
| [21] | Appl. No. | 806,130 |
| [22] | Filed | Mar. 11, 1969 |
| [45] | Patented | May 11, 1971 |
| [73] | Assignee | Joseph Lucas (Industries) Limited<br>Birmingham, England |
| [32] | Priority | Mar. 18, 1968, Aug. 9, 1968 |
| [33] | | Great Britain |
| [31] | | 12895/68 and 38067/68 |

[54] METHOD OF MAKING DYNAMOELECTRIC MACHINES
3 Claims, 3 Drawing Figs.

[52] U.S. Cl. ................................................... 29/596,
29/605, 72/135, 310/216
[51] Int. Cl. .................................................... H02k 15/00
[50] Field of Search ........................................... 29/596,
598, 609, 605, 157.3 (AH); 113/1.1, 1.2, 1 (C);
72/135, 136; 310/216

[56] References Cited
UNITED STATES PATENTS

| 2,845,555 | 7/1958 | Carpenter et al. | 310/216 |
| 3,062,267 | 11/1962 | Hart et al. | 29/605UX |
| 3,152,629 | 10/1964 | Rediger | 29/605UX |
| 3,225,424 | 12/1965 | Wiley | 29/605 |
| 3,436,812 | 4/1969 | Aoki et al. | 29/596 |
| 3,464,101 | 9/1969 | Zubal et al. | 29/605X |

Primary Examiner—John F. Campbell
Assistant Examiner—Carl E. Hall
Attorney—Holman, Glascock, Downing & Seebold ABSTRACT: A method of forming a stator assembly for a dynamoelectric machine includes the steps of forming a continuous metal strip with stator slots along one peripheral edge and gear teeth along the other peripheral edge and then using a gear wheel engaging the gear teeth to drive the strip onto a former to coil the strip helically. In a modification, in order to produce a yoke or a stator assembly for a dynamoelectric machine a continuous metal strip is formed with gear teeth along one peripheral edge thereof and a gear wheel is engaged with the gear teeth and drives the strip onto a former to coil the strip helically to produce the yoke or stator assembly. The gear teeth in the strip can be the stator slots where a stator assembly is to be produced, or can be specially provided gear teeth where a yoke assembly is to be produced.

Patented May 11, 1971
3,577,851
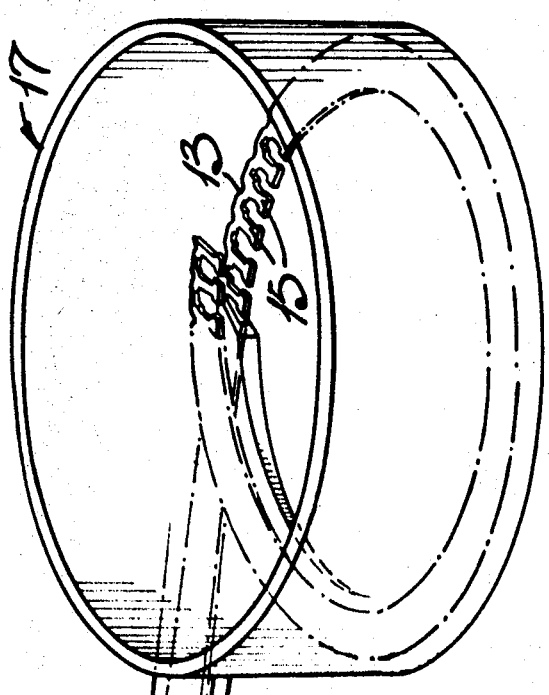
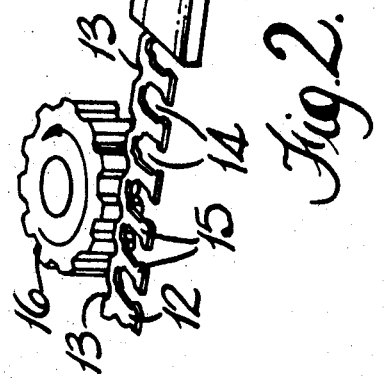
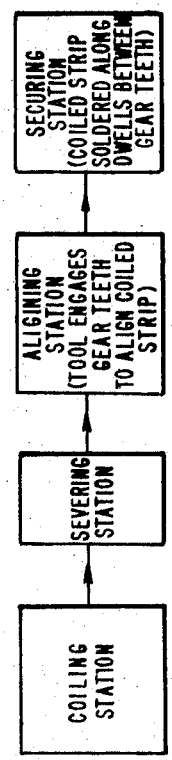
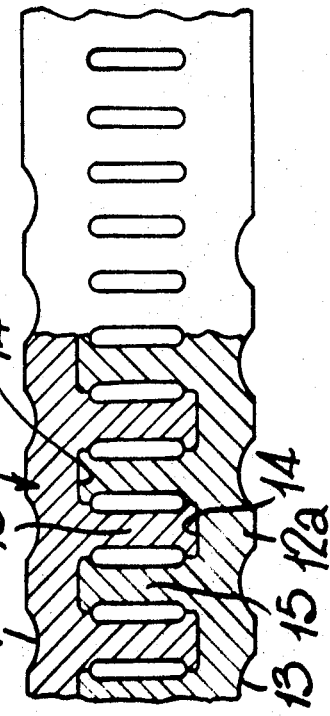
Fig. 1.
Fig. 2.
Fig. 3.
INVENTOR
John Stanley Dethridge & John William March
BY Holman, Glascock, Downing & Seebold
ATTORNEYS

METHOD OF MAKING DYNAMOELECTRIC MACHINES

This invention relates to a method of forming a stator assembly for dynamoelectric machine, the assembly being of the kind including a laminated member in the form of a helically coiled metal strip.

A method according to the invention comprises forming a continuous metal strip with stator slots along one peripheral edge and gear teeth along the other peripheral edge, and using a gear wheel engaging said gear teeth to drive said strip onto a former, to coil said strip helically.

The stator slots can be stamped from the metal strip very quickly, but considerable difficulty has been experienced in providing a satisfactory drive for the strip which will operate at a speed comparable with the speed at which the slots can be stamped. The provision of gear teeth on the edge of the strip opposite the stator slots enables the strip to be driven using a gear wheel, and it has been found that in this way the strip can be driven so quickly that one forming machine can be used for several stamping machines.

The invention further resides in a method of forming a yoke or a stator assembly for a dynamoelectric machine, including the steps of forming a continuous metal strip with gear teeth along one peripheral edge thereof, and then using a gear wheel engaging said gear teeth to drive said strip onto a former to coil said strip helically to produce the yoke or stator assembly.

In the accompanying drawings:

FIG. 1 is a plan view of a metal strip at one stage of a process according to one example of the invention, FIG. 2 is a diagrammatic perspective view of the strip shown in FIG. 1 at a later stage in the process, and FIG. 3 is a block diagram illustrating the process partly shown in FIGS. 1 and 2.

Referring to the drawings, a rectangular strip 11 of material is subjected to a stamping operation which forms two strips 12, 12a simultaneously, each of the strips 12, 12a having gear teeth 13 in its outer peripheral edge and stator slots 14 in its inner peripheral edge with the stator slots 14 of one strip 12 occupied by the fingers 15 of the other strip 12a which define the stator slots 14 therebetween. The strips 12, 12a are identical and it will be seen that this process wastes only a very small amount of material.

Each strip is fed to a forming machine which includes a gear wheel 16 engaging the gear teeth 13. The gear wheel 16 drives the strip into a former 17 which coils the strip to helical form. When the coil of strip has the desired axial length, it is cut off from the remainder of the strip, and a forming tool is engaged with the gear teeth 13 of the coiled strip to align the stator slots 14 and is soldered along the dwells between the teeth 13, to retain the coiled strip in a position with the stator slots 14 aligned. Stator windings are then engaged in the slots 14 and the stator assembly so produced is mounted in conventional manner in a dynamoelectric machine.

In a modification the strips 12 are formed without the gear teeth 13, and are driven into the former 17 by a gear wheel which engages the stator slots 14, thus the stator slots 14 in this example constitute gear teeth. Conveniently the gear wheel driving a strip rotates in a plane at right angles to the plane of the strip.

It will be appreciated of course that the strip can be formed in any convenient manner as long as it has the required gear teeth.

In a further modification, it is desired to produce a yoke for a dynamoelectric machine. The method employed is similar to that described above with the exception that no stator slots are required. Thus a strip is stamped to provide gear teeth along one peripheral edge thereof and the strip is then driven by means of a gear wheel engaging said gear teeth into a former which coils the strip to helical form. When the yoke so formed has the required axial length it is severed from the strip and is then welded or pinned under pressure to form a compact laminated arrangement. Pressure applied to each axial end of the yoke causes the ends of the strip to be flattened and extend parallel to one another. The pole pieces are secured to the yoke by pole screws or in any other convenient manner.

We claim:

1. A method of forming a stator assembly for a dynamoelectric machine the assembly being of the kind including a laminated member in the form of a helically coiled metal strip, comprising, forming a continuous metal strip with stator slots along one peripheral edge of the strip, and gear teeth along the other peripheral edge of the strip, the formation of the gear teeth serving to relieve one edge of the strip to facilitate coiling of the strip, engaging a gear wheel with said gear teeth, and, rotating said gear wheel so as to drive said strip into a former, the shape of the former being such that as the strip is driven into the former, the strip coils in a helical manner.

2. A method as claimed in claim 1 including the steps of severing the helically coiled strip from the remaining strip, engaging a tool with the gear teeth of the helically coiled strip to align the stator slots of the coiled strip and then treating the coiled strip to retain the strip in position with the stator slots aligned.

3. A method as claimed in claim 2 wherein said coiled strip is soldered along dwells between its gear teeth to retain the strip in position with the stator slots aligned.